Feb. 10, 1948.  F. BAUTZ  2,435,565
SUPERFINISHING DEVICE FOR CURVED SURFACES
Filed June 11, 1945
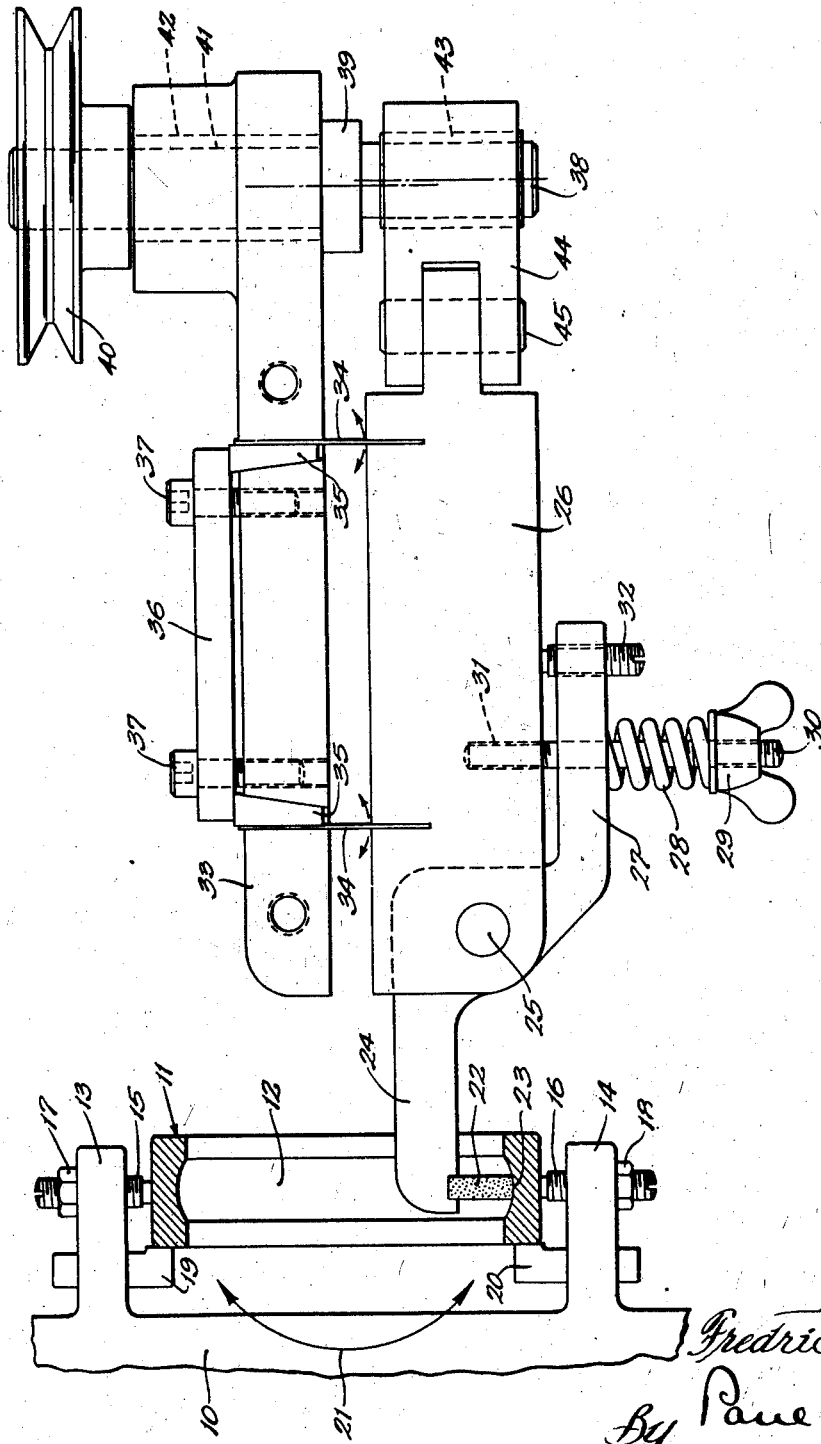
Inventor:
Fredrick Bautz,
By Paul O. Pippel
Attorney.

Patented Feb. 10, 1948

2,435,565

UNITED STATES PATENT OFFICE 2,435,565

SUPERFINISHING DEVICE FOR CURVED SURFACES

Fredrick Bautz, Chicago, Ill., assignor to International Harvester Company, a corporation of New Jersey Application June 11, 1945, Serial No. 598,745

6 Claims. (Cl. 51—58)

This invention relates to a new and improved finishing device for curved surfaces and particularly curved cylindrical bearing surfaces or other work pieces where it is essential that the surface be perfectly smooth.

Ball bearings are equipped with inner and outer races spaced apart by a series of balls which are either allowed to run loosely around the annular space provided between the inner and outer races or are caged within a retainer fixed in this annular space between the inner and outer races so that the balls will be evenly spaced apart at all times. In recent applications of ball bearings on large machinery such as automotive vehicles which are shipped after assembly, it has been found that during prolonged shipping periods the bearings receive the load of the vehicle at one point, and the balls in the bearings tend to make a permanent set in the races. When the vehicles are eventually driven and the bearings actually come into use, this permanent set causes vibration of the vehicles. Several years ago, a patent issued to Wallace 2,195,064 showing and describing a three-motion honing device for flat cylindrical surfaces. To date, however, no one has ever employed three-motion honing to a curved cylindrical surface.

At the present time ball bearing races are ground with a stone which uses oscillating and rotating motions. To the naked eye, the surface appears to be quite smooth. However, in reality it is lined with a series of ridges which although not visible are quite detrimental to good operation of ball bearings. In order to remedy this condition, the races are manually lapped with a soft pad and a lapping compound. This lapping of the roughly ground surface causes the ridges left by grinding to be pushed down or bent over into the valleys between these ridges. The result of this lapping is a highly polished surface, but the time required to produce such polished surface is excessive and not conducive to mass production. A second disadvantage of the lapped surface is the fact that it takes an initial setting, such as described above, when a load is applied to the bearing and the bearing is not immediately used.

The Wallace patent shows the employment of a hone which is a fine hard stone, in contradistinction to the soft pad and lapping compound formerly used to obtain a polished surface. The Wallace patent shows movement of this hone in three directions. This finishing or honing motion in three directions cuts off the ridges created by the grinding of the surface down to the root diameter of the valleys between the ridges. Further, finishing operation by the hone will be ineffective in removing any more of the surface, because the pressure at which the hone is applied to the surface is not sufficient to rupture the oil film which extends over the newly finished surface.

It is therefore an important object of this invention to provide a third motion in the honing of curved surfaces to eliminate the possibility of the curved surface taking an initial undesirable set when that curved surface is in a bearing or the like.

Other and further important objects of this invention will become apparent from the following specification and accompanying drawing.

The drawing shows a side elevational view, partially in section, of the finishing device for curved cylindrical surfaces of this invention.

As shown in the drawing:

The reference numeral 10 indicates generally a work-head capable of rotating and oscillating simultaneously. The curved surface to be superfinished is an outer ball bearing race 11 shown in section so that the internal curved surface 12 is clearly disclosed. It is quite obvious that an inner ball bearing race could be operated upon in the same manner. The race 11 is clamped between posts 13 and 14 projecting outwardly from the work-head 10. Set screws 15 and 16 are adapted to threadedly engage the posts 13 and 14 respectively and press against the outer periphery of the race 11. Lock nuts 17 and 18 are adapted to hold the set screws 15 and 16 in fixed position. Guide members 19 and 20 are positioned at diametrically opposite sides of the race 11 for the purpose of installing the race in a perfectly alined position. These guide members 19 and 20 are supported by the posts 13 and 14 respectively. The work-head 10 rotates about a horizontal axis through the center of the ball bearing race and oscillates in a manner indicated by the arrow 21. This arcuate oscillation is equal to the arcuate surface of the race, and it will be understood that the rotation and oscillation of the work-head 10 supply two of the necessary three motions for thorough finishing.

A hone or other abrading element 22 having a convex working edge 23 is adapted to ride within the curved surface 12 of the ball bearing race 11. The hone 22 is fixed in a work arm 24 pivoted at 25 in a supporting fixture 26. A lower extension 27 of the arm 24 extends beneath and along the fixture 26 and is held against the fixture 26 by means of a spring 28 which has its tension adjustable by means of a wing nut 29 operating on a threaded pin 30 which is fastened to the fixture 26 as shown at 31. The tension on this spring 28 determines the amount of force which the hone 22 applies to the curved surface 12 of the ball bearing race 11. Limit means to prevent over-honing of the device is provided in the form of a set screw 32 adjustably threaded in the outer end of the arm 27 and adapted to abut the body of the fixture 26 at various levels thereof.

The fixture 26 is suspended from a stationary support 33 by means of metal reeds or the like 34. These reeds 34 are fixedly attached at their bottom portions to the fixture 26 and are adjustably attached to the support 33 by means of wedge-like clamp members 35. These wedges 35 are forced against the reeds 34 by means of a cross member 36 being forced downwardly thereon by screws 37 threadedly engaging the support 33. It is apparent that the distance from which the fixture 26 is suspended from the support 33 may be varied by the gripping of the reeds 34 at different levels. The purpose of having the fixture 26 suspended at a definite distance beneath the support 33 is to obtain the same radial arcuate movement of the reeds 34 as the radius of the arcuate race surface.

The fixture 26 is reciprocated by an eccentric 38 mounted on a driving member 39 and driven from some external source of power through a pulley 40. The pully 40 has a driven shaft 41 journaled in a bushing 42 within the fixture 33 and drives the member 39 which in turn drives the eccentric 38. A bushing 43 surrounds the eccentric 38 within a block 44 which is attached to the fixture 26 by a joint 45. Upon rotation of the pulley 40, the eccentric 38 causes the block 44 to be longitudinally reciprocated, and this longitudinal reciprocation is imparted to the fixture 26 by means of the joint 45. This plain reciprocation is converted into a pendulum movement about the reeds 34. The arcuate movement made by the fixture 26 is permitted by sliding of the block 44 up and down very slightly on the eccentric pin 38. The eccentricity of the driving eccentric 38 is very slight, and hence the reciprocation is also very slight so that, in effect, the fixture 26 is merely vibrated. The suspended vibration of the hone 22 added to the dual movement of the work head 10 is sufficient to cause the curved surface being honed to have a high polished finish. The hone 22 will therefore not pass over the same surface in the same manner more than once, and hence the ridges caused by grinding may be removed without causing new ridges to be formed. Therefore, the ultimate has been attained in honing of curved surfaces.

It is obvious that other means may be employed in securing the vibration for the hone member and especially in vibrating it through an arcuate swinging movement such as is obtained by the metal reeds 34. It is my intention therefore not to limit the patent granted hereon otherwise than as necessitated by the appended claims.

What is claimed is:

1. A finishing device for work pieces having curved cylindrical surfaces comprising means for rotating and oscillating said work pieces, an abrading element, means for supporting said abrading element in contacting relationship with the rotating and oscillating work piece, and said means for supporting said abrading element including a means for causing said abrading element to be swung through an arcuate radius substantially equal to the radius of the curved cylindrical surface of the work piece, whereby at least three different motions are employed in the finishing of the work piece.

2. A finishing device for annular curved bearing races, means for rotating and oscillating said bearing races, and a vibrating hone adapted to operatively engage the rotating and oscillating bearing race at one section of its periphery and follow the curvature of the bearing race with its vibrations.

3. A finishing device for annularly extending and curved bearing surfaces, means for rotating and oscillating said bearing surfaces in a work head, a hone adapted to ride on the surface to be finished, a fixture for holding said hone, said fixture having a stationary portion and a movable portion with which the hone moves, means for suspending said movable portion of the fixture from said stationary portion, and means for causing swinging of said movable portion whereby at least three movements are employed in the finishing process.

4. A finishing device for annularly extending and curved bearing surfaces which are rotated and oscillated in a work head, comprising a hone adapted to ride on the surface to be finished, a fixture for holding said hone, said fixture having a stationary portion and a movable portion with which the hone moves, means for suspending said movable portion of the fixture from said stationary portion, and means for causing swinging of said movable portion, said means for suspending including reeds having a length substantially equal to the radius of said curved surface to be finished.

5. A finishing device for annularly extending and curved bearing surfaces which are rotated and oscillated in a work head, comprising a hone adapted to ride on the surface to be finished, a fixture for holding said hone, said fixture having a stationary portion and a movable portion with which the hone moves, means for suspending said movable portion of the fixture from said stationary portion, and means for causing swinging of said movable portion, said means for suspending including reeds having a length substantially equal to the radius of said curved surface to be finished, said means for causing swinging including a rotatable eccentric driving member engaging said movable member.

6. A finishing device for annularly extending and curved bearing surfaces which are rotated and oscillated in a work head, comprising a hone adapted to ride on the surface to be finished, a fixture for holding said hone, said fixture having a stationary portion and a movable portion with which the hone moves, means for suspending said movable portion of the fixture from said stationary portion, and means for causing swinging of said movable portion, said means for suspending including reeds having a length substantially equal to the radius of said curved surface to be finished, and said means for causing swinging of said movable member including an eccentric driving member slidingly engaging said movable portion to permit swinging of said movable portion about its reed suspension.

FREDRICK BAUTZ.

REFERENCES CITED

The following references are of record in the file of this patent:

UNITED STATES PATENTS

| Number | Name | Date |
|---|---|---|
| 2,076,601 | Strong | Apr. 13, 1937 |
| 2,252,096 | Pew | Aug. 12, 1941 |
| 2,258,037 | Storz | Oct. 7, 1941 |
| 2,270,525 | Johnson | Jan 20, 1942 |
| 2,277,589 | Hanson | Mar. 24, 1942 |
| 2,280,379 | Cramer | Apr. 21, 1942 |